United States Patent
Smirnov

(10) Patent No.: US 8,023,697 B1
(45) Date of Patent: Sep. 20, 2011

(54) SYSTEM AND METHOD FOR IDENTIFYING SPAM IN RASTERIZED IMAGES

(75) Inventor: Evgeny P. Smirnov, Moscow (RU)

(73) Assignee: Kaspersky Lab ZAO, Moscow (RU)

( * ) Notice: Subject to any disclaimer, the term of this patent is extended or adjusted under 35 U.S.C. 154(b) by 0 days.

(21) Appl. No.: 13/074,118

(22) Filed: Mar. 29, 2011

(51) Int. Cl.
*G06K 9/36* (2006.01)

(52) U.S. Cl. .......... 382/100; 382/199; 709/206

(58) Field of Classification Search .......... 382/100, 382/112, 176, 197, 199, 286; 709/204, 205, 709/206
See application file for complete search history.

(56) References Cited

U.S. PATENT DOCUMENTS

| | | | |
|---|---|---|---|
| 6,259,812 B1 | 7/2001 | Mao et al. | 382/186 |
| 6,470,094 B1 | 10/2002 | Lienhart et al. | 382/176 |
| 6,594,393 B1 | 7/2003 | Minka et al. | 382/218 |
| 6,608,930 B1 | 8/2003 | Agnihotri et al. | 382/176 |
| 6,738,518 B1 | 5/2004 | Minka et al. | 382/176 |
| 6,744,937 B1 | 6/2004 | Rossi et al. | 382/309 |
| 6,798,913 B2 | 9/2004 | Toriyama | 382/229 |
| 7,171,046 B2 | 1/2007 | Myers et al. | 382/187 |
| 7,706,613 B2 | 4/2010 | Smirnov | 382/182 |
| 7,706,614 B2 | 4/2010 | Smirnov | 382/182 |
| 7,711,192 B1 | 5/2010 | Smirnov | 382/182 |
| 2004/0190790 A1 | 9/2004 | Zuev et al. | 382/291 |
| 2004/0221062 A1 | 11/2004 | Starbuck et al. | 709/246 |
| 2004/0255249 A1 | 12/2004 | Chang et al. | 715/723 |
| 2004/0264774 A1 | 12/2004 | Anisimovich et al. | 382/173 |
| 2005/0216564 A1 | 9/2005 | Myers et al. | 709/206 |
| 2005/0281455 A1 | 12/2005 | Huang | 382/156 |
| 2008/0127340 A1* | 5/2008 | Lee | 726/22 |
| 2009/0043853 A1* | 2/2009 | Wei et al. | 709/206 |
| 2009/0100523 A1* | 4/2009 | Harris | 726/26 |
| 2010/0254567 A1* | 10/2010 | Kim | 382/100 |

FOREIGN PATENT DOCUMENTS

| | | |
|---|---|---|
| CA | 2348633 A1 | 4/2000 |
| DE | 19945533 A1 | 3/2001 |
| JP | 2003101693 A | 4/2003 |
| RU | 2234734 C1 | 8/2004 |
| RU | 2249251 C2 | 3/2005 |
| RU | 2251151 C2 | 4/2005 |
| RU | 2007 140 039 A | 10/2009 |

* cited by examiner

*Primary Examiner* — Andrew W Johns
(74) *Attorney, Agent, or Firm* — Arent Fox LLP; Michael Fainberg

(57) ABSTRACT

Disclosed are systems, methods and computer program products for detection of spam in raster images. In one example embodiment, a method comprises identifying objects in the raster image; tracing contours of identified objects; computing, angles of inclination of tangents at plurality of points on an object contour; determining, based on the computed angles of inclination, one or more attributes of the object contour, including lengths of line segments of the contour, angles between the line segments, lengths of arcs the contour and radii of curvature of the arcs; generating object signatures containing one or more attributes of the object contours; comparing object signatures of the image with known spam image signatures; and determining that the image contains spam if the number of object signatures that are substantially similar to the known spam image signatures exceeds a predetermined threshold.

20 Claims, 18 Drawing Sheets

*ATTENTION ALL DAY TRADERS AND INVESTORS*

INVESTOR ALERT!
IT LOOKS LIKE ANOTHER RUN FOR SWNM!
WATCH SWNM LIKE A HAWK ON Monday July 31, 2006

Company Name: SOUTHWESTERN MEDICAL, INC.
Stock Symbol: SWNM
Friday Close: 0.09
Market Cap: $33,000,000.00 (Approx)

SWNM.PK RELEASES BREAKING NEWS!
Southwestern Medical Solutions, Inc. (PINKSHEETS: SWNM),
is pleased to announce that it has entered into the formal stages
of negotiations regarding Pacific Rim nations distribution
for its proprietary Labguard(TM) product line.

During the last 3 months, Southwestern Medical has held discussions,
gathered data, and explored the prospective licensing of its Labguard(TM)
diagnostic system, to be sold through internationally based distribution
companies into Pacific Rim areas. The initial interest has been for the sale
of the product for government employee testing programs such as police
forces, local and state level workers, and also includes higher-level workforces.
Reasons cited for the interest of the Labguard(TM) product have been the
enhanced ease of use of the product and immediate on-site confirmation
as well as increased reliability of the results.
(CHECK FAVORITE NEWS SITE FOR MORE)

--ADD THIS GEM TO YOU RADAR AND WATCH TRADE ON MONDAY!
--DON'T EVEN BLINK!
--SWNM DOESN'T SLEEP!

Removal: rmvrmv_me@yahoo.com
Disclaimer: http://www.ehshwbz.info

Fig. 3

*ATTENTION ALL DAY TRADERS AND INVESTORS*

INVESOTR ALERT!
IT LOOKS LIKE ANOTHER RUN FOR SWNM!
WATCH SWNM LIKE A HAWK ON Monday July 31, 2006

Company Name:   SOUTHWESTERN MEDICAL. INC.
Stock Symbol:   SWNM
Friday Close:   0.09
Market Cap:     $33,000,000.00 (Approx)

SWNM.PK RELEASES BREAKING NEWS !
Southwestern Medical Solutions, Inc. (PINKSHEETS: SWNM),
is pleased to announce that it has entered into the formal stages
of negotiations regarding Pacific Rim nations distribution for its
proprietary Labguard(TM) product line.

During the last 3 months, Southwestern Medical has held discussions,
gathered data, and explored the prospective licensing of its Labguard(TM)
diagnostic system, to be sold through internationally based distribution
companies into Pacific Rim areas. The initial interest has been for the sale
of the product for government employee testing programs such as police
forces, local and state level workers, and also includes higher-level workforces.
Reasons cited for the interest of the Labguard(TM) product have been the
enhanced ease of use of the product and immediate on-site confirmation
as well as increased reliability of the results.
(CHECK FAVORITE NEWS SITE FOR MORE)

— ADD THIS GEM TO YOUR RADAR AND WATCH TRADE ON MONDAY!
— DON'T EVEN BLINK!
— SWNM DOESN'T SLEEP!

Removal:   rmv_me@yahoo.com
Disclaimer:   http://www.ehshwibz.info

Fig. 4

***ATTENTION ALL DAY TRADERS AND INVESTORS***

Company Name: SOUTHWESTERN MEDICAL, INC.
Stock Symbol: SWNM
Friday Close: 0.09
Market Cap: $33,000,000.00 (Approx)

SWNM.PK RELEASES BREAKING NEWS!
Southwestern Medical Solutions, Inc. (PINKSHEETS: SWNM), is pleased to announce that it has entered into the formal stages of negotiations regarding Pacific Rim nations distribution for its proprietary LabGuard(TM) product line.

During the last 3 months, Southwestern Medical has held discussions, gathered data, and explored the prospective licensing of its LabGuard(TM) diagnostic system, to be sold through internationally based distribution companies into Pacific Rim areas. The initial interest has been for the sale of the product for government employee testing programs such as police forces, local and state officeworkers, and also includes higher-level workforces. Reasons cited for the interest of the LabGuard(TM) product have been the enhanced ease of use of the product and immediate on-site confirmation as well as increased ability of the results.
(CHECK FAVORITE NEWS SITE FOR MORE)

-- ADD THIS GEM TO YOUR RADAR AND WATCH TRADE ON MONDAY!
-- DON'T EVEN BLINK!
-- SWNM DOESN'T SLEEP!

Remove: _____
Disclaimer: _____

| | | 0 | 0 | 360 | |
|---|---|---|---|---|---|
| | 45 | | | | 315 |
| 63 | | | | | 270 |
| 80 | 180 | 180 | 180 | 180 | 225 |
| 108 240 | | | | | |
| 135 297 | | | | 90 | |
| | 0 180 | 0 180 | 0 180 | | |

| | 90 | | | | 90 |
|---|---|---|---|---|---|
| | 270 | | | | 270 |
| | 270 | | | | 270 |
| | 71 280 | 0 180 | 0 180 | | 251 |
| 71 225 | | | | 21 197 | |
| 270 | | | | 270 | |
| 90 | | | | 90 | |

| | | 0 | 0 | 0 | 360 | 315 |
|---|---|---|---|---|---|---|
| | 63 | | | | | 282 |
| | 100 | | | | | 260 |
| | | 100 | 180 | 180 | | 251 |
| | | 71 180 | | | 21 197 | |
| | 45 225 | | | | 270 | |
| 90 | | | | | 90 | |

SYSTEM AND METHOD FOR IDENTIFYING SPAM IN RASTERIZED IMAGES

TECHNICAL FIELD

The present disclosure relates generally to the field of computer science and, in particular, to systems, methods and computer program products for identifying spam in images.

BACKGROUND

Identification of spam in email messages received over a communications' network becomes an extremely pressing problem with ever increasing popularity of unsolicited email-based product and service advertising. There are many different technical solutions for identifying spam in the ordinary text messages, but the task of identifying spam is much more difficult in the case of text spam embedded in an image as well as spam images, such as images of unsolicited products, services, etc. Identification of image-based spam is difficult because spam detection system must first identify the text in the image and then determine whether this text can be classified as spam. In case there is no text in the image, the detection system must identify the image itself as spam. Known approaches for identify spam in images have a number of shortcomings, such as slow execution attributed to the complexity of the algorithm and to a large number of errors during detection of spam. Accordingly, there is a need for a more efficient and effective mechanism for detection of spam in images.

SUMMARY

Disclosed herein are systems, methods and computer program products for detection of spam in raster images. In one example embodiment, a method comprises receiving an image for processing. If the image is in a vector format it may be converted into a raster format. If the image is in a multicolor format, it may be converted into a grayscale format. Then, one or more objects are identified in the raster image; including text and graphic objects. The objects that are too small, e.g., few pixels in diameter, may be ignoring from further processing. Then, contours of the remaining objects are traced. The contour tracing may be implemented in the following manner: identifying a background as a plurality of pixels having a first shade of gray, identifying one or more pixels that have a second shade of gray, defining object contour at the first pixel having the second shade of gray, and repeatedly expanding the contour of the object in those directions where pixels adjacent to the background pixels are of the second shade of gray.

Once contours of the objects have been traced, object signatures may be generated. An object signature identifies graphical attributes constituting the contour, including, for example, lengths of straight line segments of the contour, angles between line segments, lengths of arcs, radii of curvature of the arcs, and other graphical elements. These attributes may be identified by, for example, constructing tangent lines at a plurality of selected contour points, computing angles of inclination of the tangent lines relative to horizontal, and determining, based on the computed angles of inclination, attributes of the object contour. The object signatures are then compared with known spam signatures in order to determine if the received image contains spam. If the number of object signatures that are substantially similar to the known spam signatures exceeds a predetermined threshold, it is concluded that the image contains spam. Otherwise, it is concluded that the image does not contain spam and image processing ends.

The above simplified summary of example embodiments of the invention serves to provide a basic understanding of such embodiments. This summary is not an extensive overview of all contemplated aspects of the invention, and is intended to neither identify key or critical elements of all embodiments nor delineate the scope of any or all embodiments. Its sole purpose is to present some concepts of one or more aspects in a simplified form as a prelude to the more detailed description that follows. To the accomplishment of the foregoing and related ends, the one or more embodiments comprise the features hereinafter fully described and particularly pointed out in the claims. The following description and the annexed drawings set forth in detail certain illustrative features of the one or more embodiments. These features are indicative, however, of but a few of the various ways in which the principles of various aspects may be employed, and this description is intended to include all such aspects and their equivalents.

BRIEF DESCRIPTION OF THE DRAWINGS

The accompanying drawings, which are incorporated into and constitute a part of this specification, illustrate one or more example embodiments of the invention and, together with the detailed description serve to explain the principles and implementations of the embodiments.

In the drawings:

FIG. 3 illustrates an example of an image containing spam.

FIG. 4 illustrates an example of the discoloration of one of the images containing spam with a dark threshold selected.

FIG. 6 illustrates an example of the discoloration of one of the images containing spam with a light threshold selected.

Figure 11A:
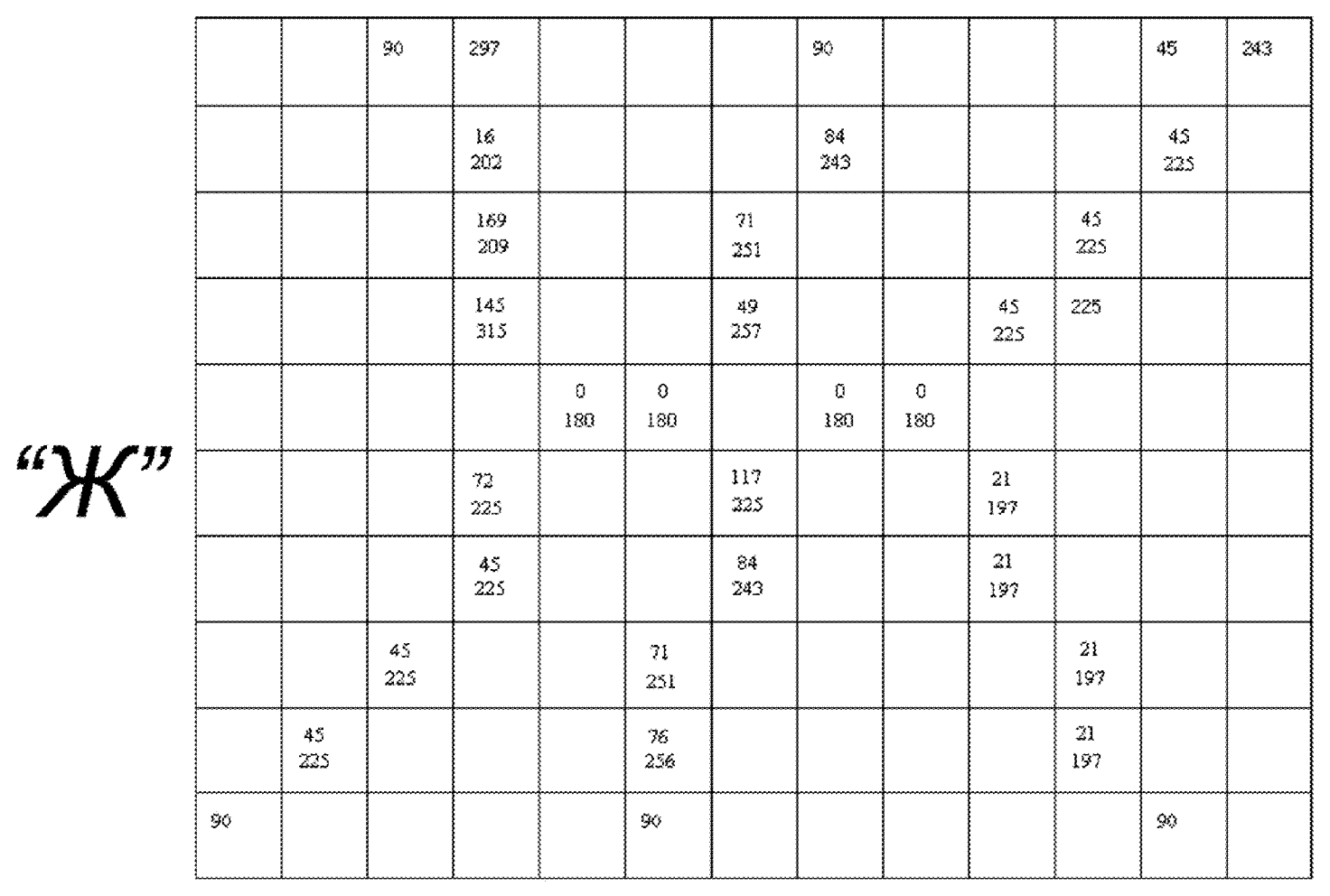

FIGS. 11A-D illustrate a graphical example of the execution of the algorithm in FIG. 10.

FIG. 12 illustrates different shapes of a number, which will be recognized as the same shape.

DETAILED DESCRIPTION OF EXAMPLE EMBODIMENTS

Example embodiments are described herein in the context of systems, methods and computer program products for identification of spam in raster images. Those of ordinary skill in the art will realize that the following description is illustrative only and is not intended to be in any way limiting. Other embodiments will readily suggest themselves to those skilled in the art having the benefit of this disclosure. Reference will now be made in detail to implementations of the example embodiments as illustrated in the accompanying drawings. The same reference indicators will be used to the extent possible throughout the drawings and the following description to refer to the same or like items.

Figure 1:
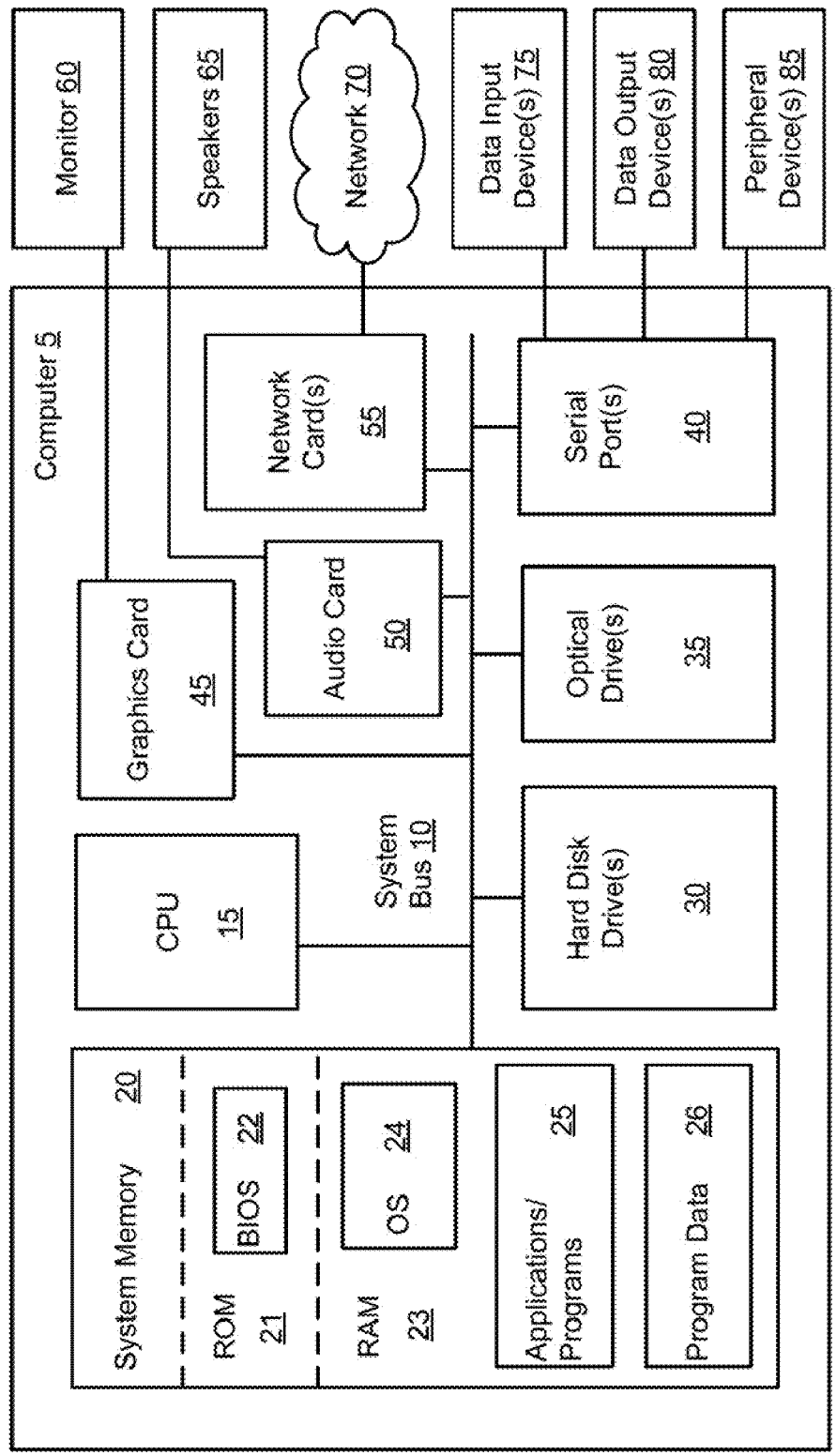
FIG. 1 illustrates an exemplary computer system for implementing techniques for image spam detection disclosed herein.

FIG. 1 depicts one example embodiment of a computer system 5 capable of implementing techniques for detection of spam in raster images disclosed herein. Computer 5 may comprise a servers, personal computers (PCs), personal digital assistants (PDA), portable computers (laptops), compact computers (laptops) and any other existing or emerging, and future computing devices connected to a computer network. As depicted, computer system 5 includes CPU 15, system memory 20, hard disk drive(s) 30, optical drive(s) 35, serial port(s) 40, graphics card 45, audio card 50 and network card (s) 55 connected by system bus 10. System bus 10 may be any of several types of bus structures including a memory bus or memory controller, a peripheral bus and a local bus using any of a variety of known bus architectures. Processor 15 may include Intel® Core 2 Quad 2.33 GHz CPU or other type of microprocessor.

System memory 20 includes a read-only memory (ROM) 21 and random access memory (RAM) 23. Memory 20 may be implemented as in DRAM (dynamic RAM), EPROM, EEPROM, Flash or other type of memory architecture. ROM 21 stores a basic input/output system 22 (BIOS), containing the basic routines that help to transfer information between the components of computer system 5, such as during start-up. RAM 23 stores operating system 24 (OS), such as Windows® Vista® or other type of OS, that is responsible for management and coordination of processes and allocation and sharing of hardware resources in computer system 5. System memory 20 also stores applications and programs 25 that are currently running on the computer 5. System memory 20 also stores various runtime data 26 used by programs 25.

Computer system 5 may further include hard disk drive(s) 30, such as 500 GB SATA magnetic hard disk drive (HDD), and optical disk drive(s) 35 for reading from or writing to a removable optical disk, such as a CD-ROM, DVD-ROM or other optical media. Drives 30 and 35 and their associated computer-readable media provide non-volatile storage of computer readable instructions, data structures, applications and program modules/subroutines that implement algorithms and Methods disclosed herein. Although the exemplary computer system 5 employs magnetic and optical disks, it should be appreciated by those skilled in the art that other types of computer readable media that can store data accessible by a computer system 5, such as magnetic cassettes, flash memory cards, digital video disks, RAMs, ROMs, EPROMs and other types of memory may also be used in alternative embodiments of the computer system.

Computer system 5 further includes a plurality of serial ports 40, such as Universal Serial Bus (USB), for connecting data input device(s) 75, such as keyboard, mouse, touch pad and other. Serial ports 40 may be also be used to connect data output device(s) 80, such as printer, scanner and other, as well as other peripheral device(s) 85, such as external data storage devices and the like. Computer system 5 may also include graphics card 45, such as nVidia® GeForce® GT 240M or other video card, for interfacing with a monitor 60 or other video reproduction device. Computer system 5 may also include an audio card 50 for reproducing sound via internal or external speakers 65. In addition, computer system 5 may include network card(s) 55, such as Ethernet, WiFi, GSM, Bluetooth or other wired, wireless, or cellular network interface for connecting computer system 5 to network 70, such as the Internet.

Figure 2:
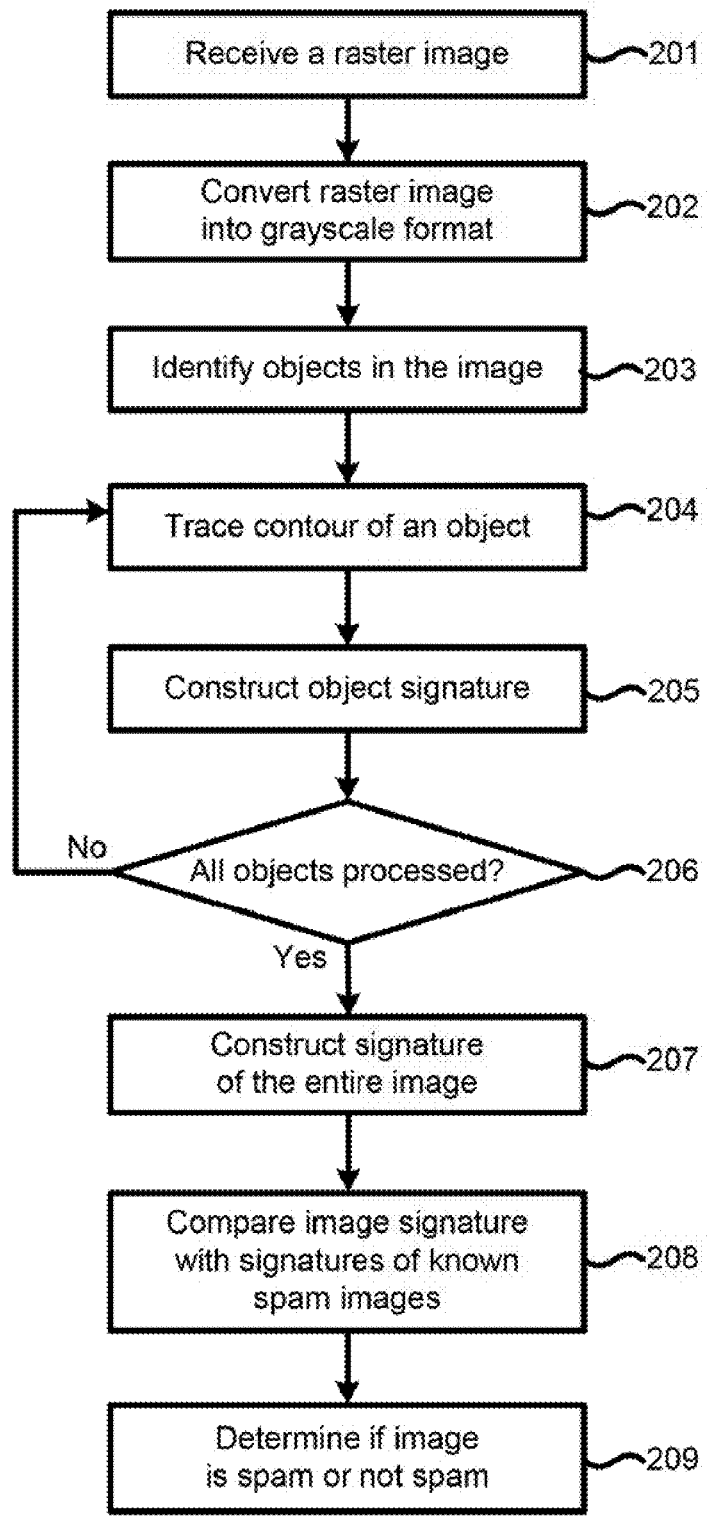
FIG. 2 illustrates a flowchart for the algorithm for image spam detection in accordance with one example embodiment.

FIG. 2 shows a flowchart of the algorithm that can be implemented in the computer system 5 for detecting spam in rasterized images in accordance with one example embodiment. At step 201, the computer system receives a rasterized image (hereinafter we will use the short form "raster"). For example, the image may be extracted from an e-mail message received from network 70. In the case received image is in vector format, it may first be converted into the raster format (in other words, essentially, to a bitmap-type image) via a process known as rasterization. Computer system 5 can use, for example, GNU libxmi library or the like, to perform image rasterization. In general, during rasterization of a vector image, a figure with specified dimensions and scale is drawn on the raster to generate a raster image.

If the raster image is colored, it may be converted into a grayscale format using known techniques, at step 202. It should be appreciated by those skilled in the art that the use of a grayscale image conversion instead of two-color (e.g., black-and-white) conversion has certain advantages. For example, as disclosed in U.S. Pat. Nos. 7,706,613, 7,706,614 and 7,711,192, which are incorporated by reference herein in their entirety, during two-color conversion, the black-and-white threshold may be set on the level of the calculated distance from the first level of gray to the found center of mass. However, if the level of gray differs somewhat, the final two-color (black-and-white) image may differ significantly from the original. For example, if the gray level is too dark, certain letters in the black-and-white image may "stick together," or one character may overlap another. If the level of gray is too, light, many letters and characters may "break up", e.g., letter "W" will turn into a double "V". In addition, when different parts of an image have text written in different colors and fonts, it may be necessary to select the sharpness of the contour for each character during black-and-white image conversion.

Figure 5:
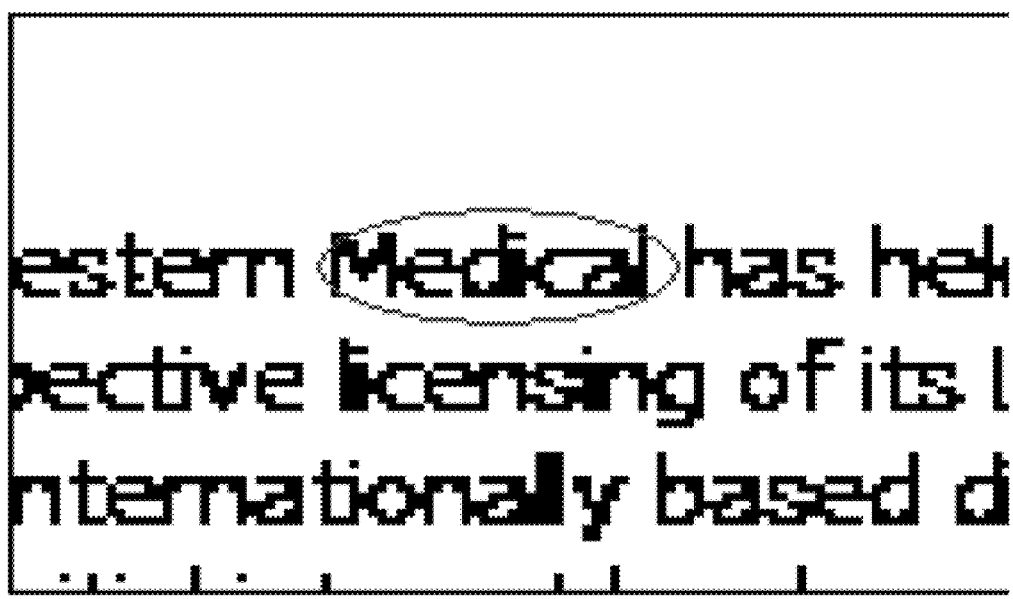
FIG. 5 illustrates an enlarged area of the image from FIG. 4.
Figure 7:
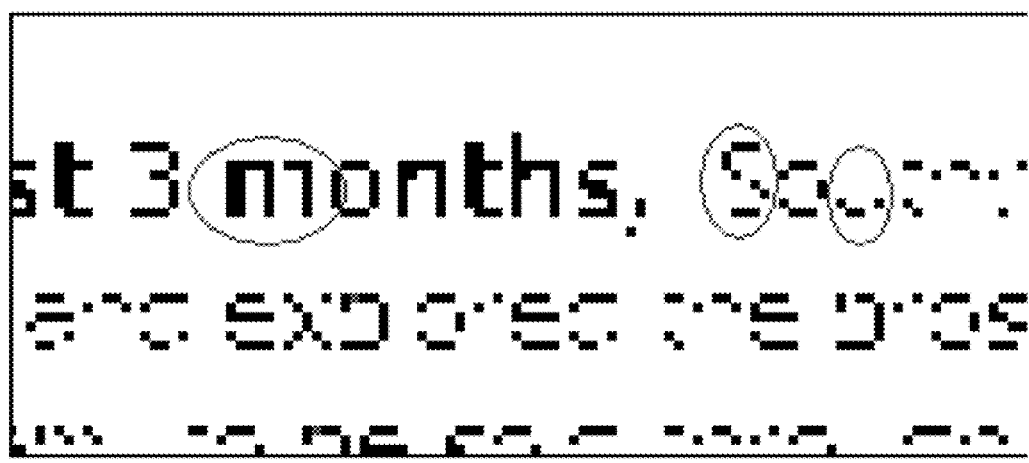
FIG. 7 illustrates an enlarged area of the image from FIG. 6.

Examples of the above problems of two-color (black-and-white) image conversion are illustrated in FIGS. 3-7. FIG. 3 depicts a sample initial image. If the selected discoloration threshold (i.e., gray level) for converting the image to two-color is too dark, the initial rasterized image may be discolored as shown in FIG. 4. As shown in FIG. 5, which is a slight enlargement of part of the text in FIG. 4, certain letters could have stuck together in this case. If the discoloration threshold is too light, the initial image could be discolored as shown in FIG. 6. FIG. 7 shows a small element of text from FIG. 6, which illustrates the "breakup" of letters.

Figure 8A:
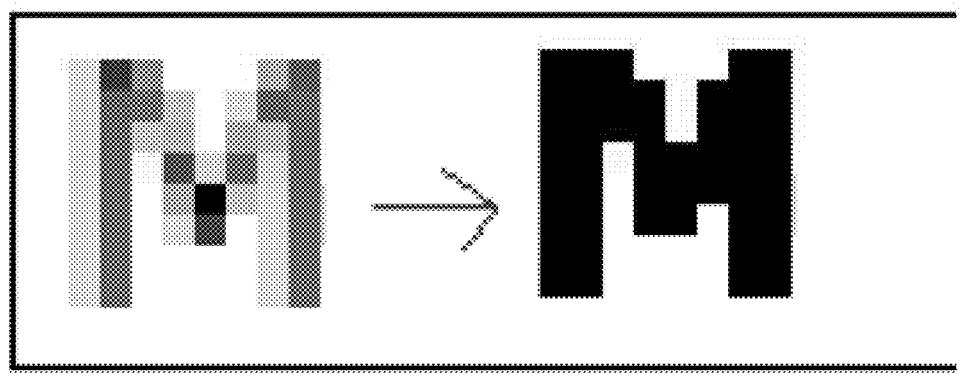
FIGS. 8A-B illustrate examples of discoloration of a raster to black and white and the use of a grayscale image with selection of the contour sharpness.
Figure 8B:
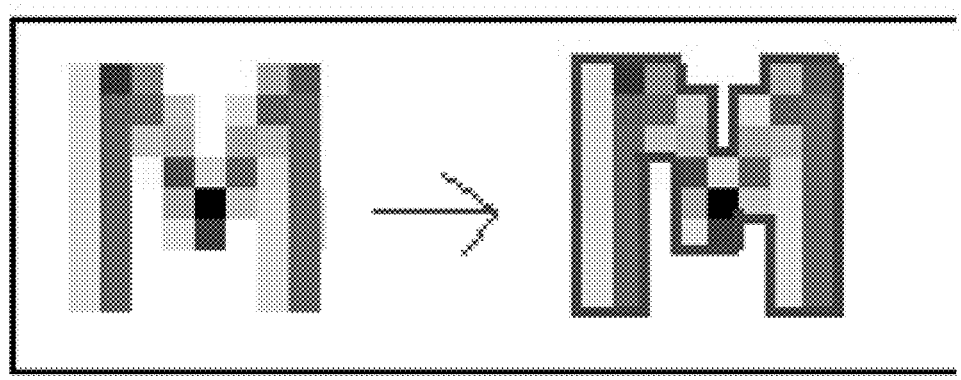

Since the initial raster image is converted into the grayscale format at step 202, there is no need to select discoloration threshold as required during black-and-white image conversion, so the above-described problems associated with incorrect selection of discoloration threshold are avoided. Instead, only anticipated contour sharpness may be selected using known techniques during conversion of the raster image into grayscale format at step 202. It has been proven experimentally that there are far fewer problems in selecting sharpness than in selecting the level of discoloration of an entire raster. FIGS. 8a and 8b respectively illustrate examples of the discoloration of a raster image to black-and-white and of the use of a grayscale image with selection of contour sharpness, as may be implemented in step 202 herein.

Referring back to FIG. 2, at step 203, one or more objects are identified on the image. In one example embodiment, to identify an object in the image, a background color is identified first using for example histogram of the grayscale image. The most dominant shade of gray may be considered as a background "color"; and all pixels having this shade of gray are considered as background, while all other groups of pixels are associated with text or graphical objects. In alternative embodiments, other known object detection techniques may be implemented.

As disclosed in U.S. Pat. Nos. 7,706,613, 7,706,614 and 7,711,192, objects that are too big (e.g. large graphic images) and too small (e.g., noise, punctuation marks, etc.) may be rejected. However, this can cause failure to detect spam containing large text and graphics. To overcome this problem, the present algorithm does not reject objects that are too large, which cannot be considered characters. Only objects that are relatively small (e.g., only a few pixels by few pixels, such as 2×2 pixels or 3×3 pixels) may be rejected from further consideration.

Figure 9:
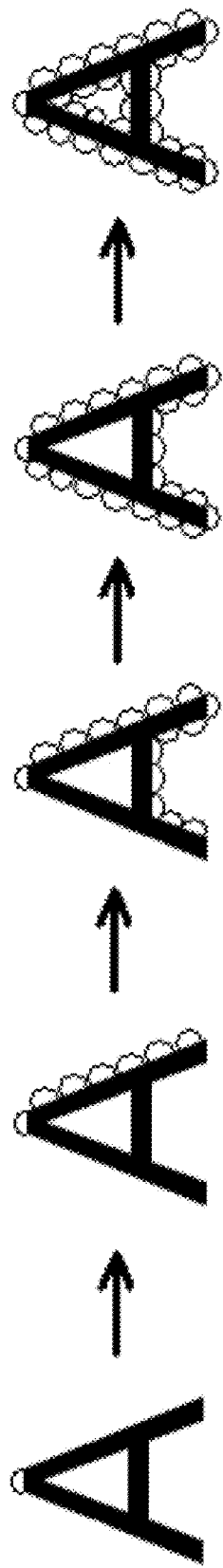
FIG. 9 illustrates an example of the construction of a contour around the object.

At step 204, contour of each object is traced as shown in FIG. 9. To trace object contour, a boundary of the object with respect to the background is identified first. In particular, upon encountering a pixel that presumably belongs to the object, in other words, a pixel having different shade of gray than the background, the algorithm checks adjacent pixels. If the adjacent pixel to one side of the current pixel is substantially the same shade as the current pixel, while the adjacent pixel on the other side is of the same shade as the background, than the current pixels is considered a contour pixel, and a pixel below the current pixels is selected for processing next. The algorithm proceeds as shown in FIG. 9 to trace contour of the object.

Figure 10:
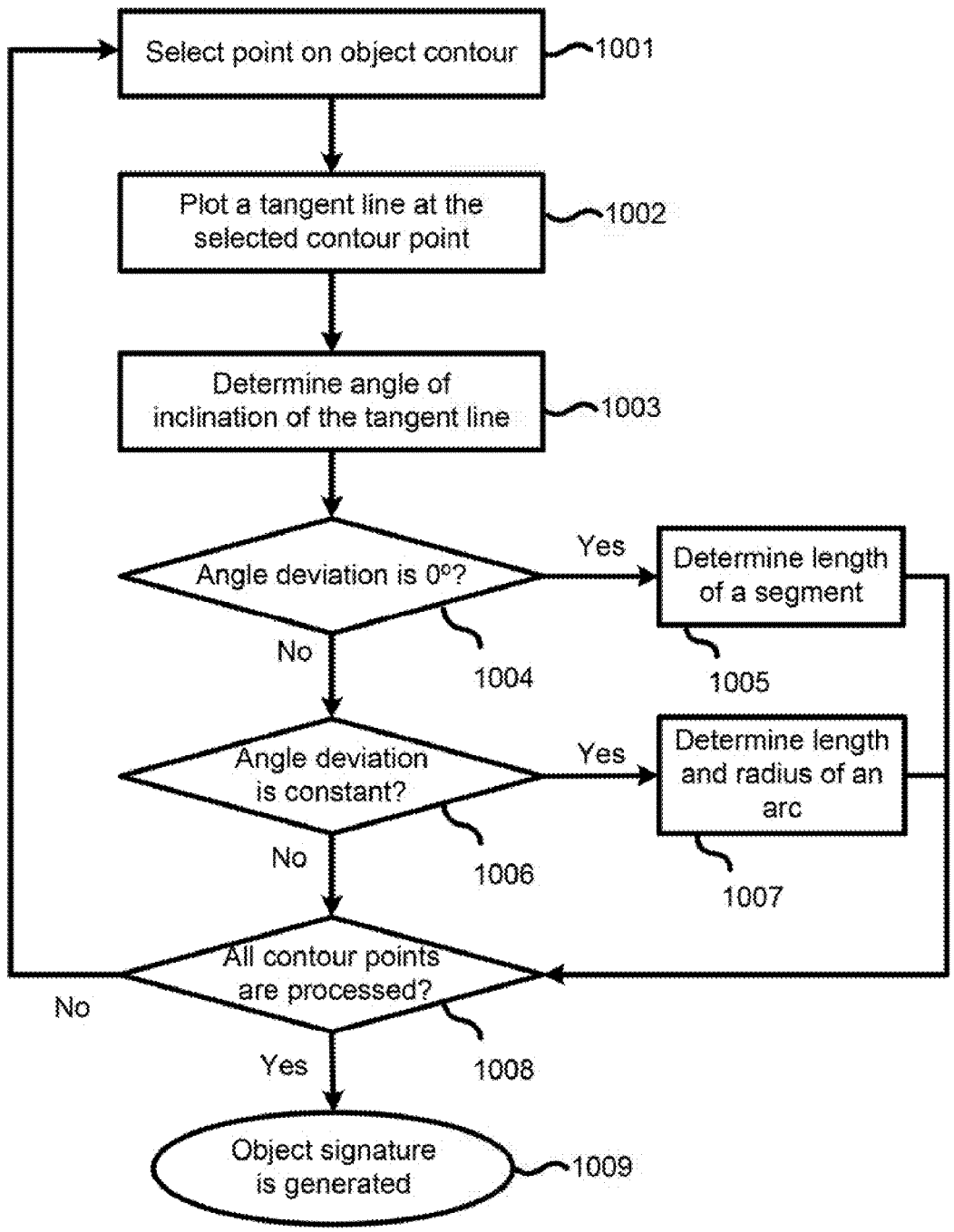
FIG. 10 illustrates the algorithm for tracing contour of an object in accordance with one example embodiment.

At step 205, object signature may be generated based on attributes of a plurality of contour points. A sample algorithm for contour attribute collection is shown in FIG. 10. At step 1001, a point on the contour, which may include one or more adjacent pixels, is selected. At step 1002, a tangent line is plotted for the selected contour point. The tangent may run within the limits of the specified number of pixels, backward and forward, relative to the sequence of travel along the contour. At step 1003, the angle of inclination of the tangent with respect to horizontal is determined. In one example embodiment, the change or deviation in the value of the angle of inclination of tangent lines at the adjacent points may be used to determine what, geometric shape is formed by these points. To that end, at step 1004, the algorithm determines if deviation of the angles of inclination of adjacent points equals zero, which means that points on the contour form a straight line segment. The length of the line segment may be calculated at step 1005. At step 1006, the algorithm determines if the deviation of the angles of inclination of several adjacent points is substantially constant, which means that these points on the contour form an arc. The length of the arc and its radius of curvature may be calculated at step 1007. Once all selected contour points have been processed, at step 1008, the computed contour attributes are collected to generate object signature at step 1009. In one example embodiment, an object signature may include, but is not limited to, the information about the lengths of line segments, angles between line segments, lengths of arcs and radii of curvature of each arc.

An example implementation of the above-described contour tracing algorithm is shown in FIGS. 11A-D for a Cyrillic word "Женя". As shown in the figure, contour of each letter of the word has been traced and selected points on the contour have been assigned numbers indicating the angles of inclination of tangent line at each selected contour point: It should be noted that some points were traced from two sides and therefore have two values. Based on the collected angle information, the algorithm will create object signature for each letter.

Figure 12:
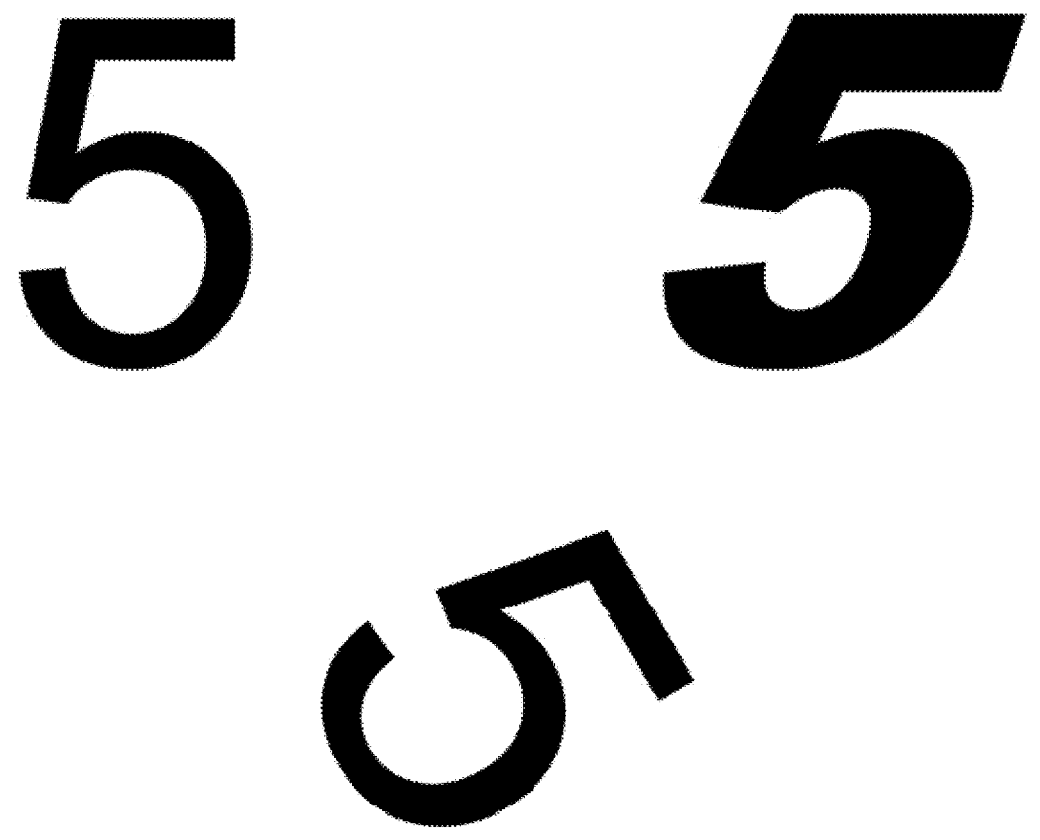

In one example embodiment, the object signature may contain lengths of line segments, angles between line segments, lengths of arcs and radii of curvature of each arc. As will be described herein, object signature may be used to detect of any object, including very complex ones, such as a facial features, as well as an enlarged, reduced, extended or rotated forms of the initial object. FIG. 12 presents an example illustrating various deformed/rotated shapes of number "5" that will be correctly recognized by comparison with a signature of number "5" stored by the system.

Once all identified objects in the raster image were processed, at step 206, a signature of the entire raster image may be constructed by combining object signatures at step 207. It must be pointed out that the objects in this case are graphical objects, not an interpretation of letters and characters. It is, however, possible to use the text detection method described in U.S. Pat. Nos. 7,706,613, 7,706,614 and 7,711,192 or other known optical character recognition (OCR) techniques to detect text in the raster image in accordance with various alternative embodiment.

Next, at step 208, the resulting image signature of the raster image may be compared with known spam images signatures in order to determine if the raster image contains spam. To that end, in accordance with one embodiment, the computer system 5 may maintain a local data store containing signatures of known spam images, including text and graphic images. The spam image signature may include signatures of various spam objects, including, for example, lengths of straight line segments of spam object contours, angles between line segments, lengths of arcs, radii of curvature of the arcs, and other graphical elements of spam object contours. The local data store may be periodically updated with information about new spam signatures from a remote global database maintained by a trusted service provider. Alternatively, the computer system 5 does not maintain a local data store of spam signatures, but rather queries a remote spam image service, which determines if the raster image being processed contains spam.

Figure 13:
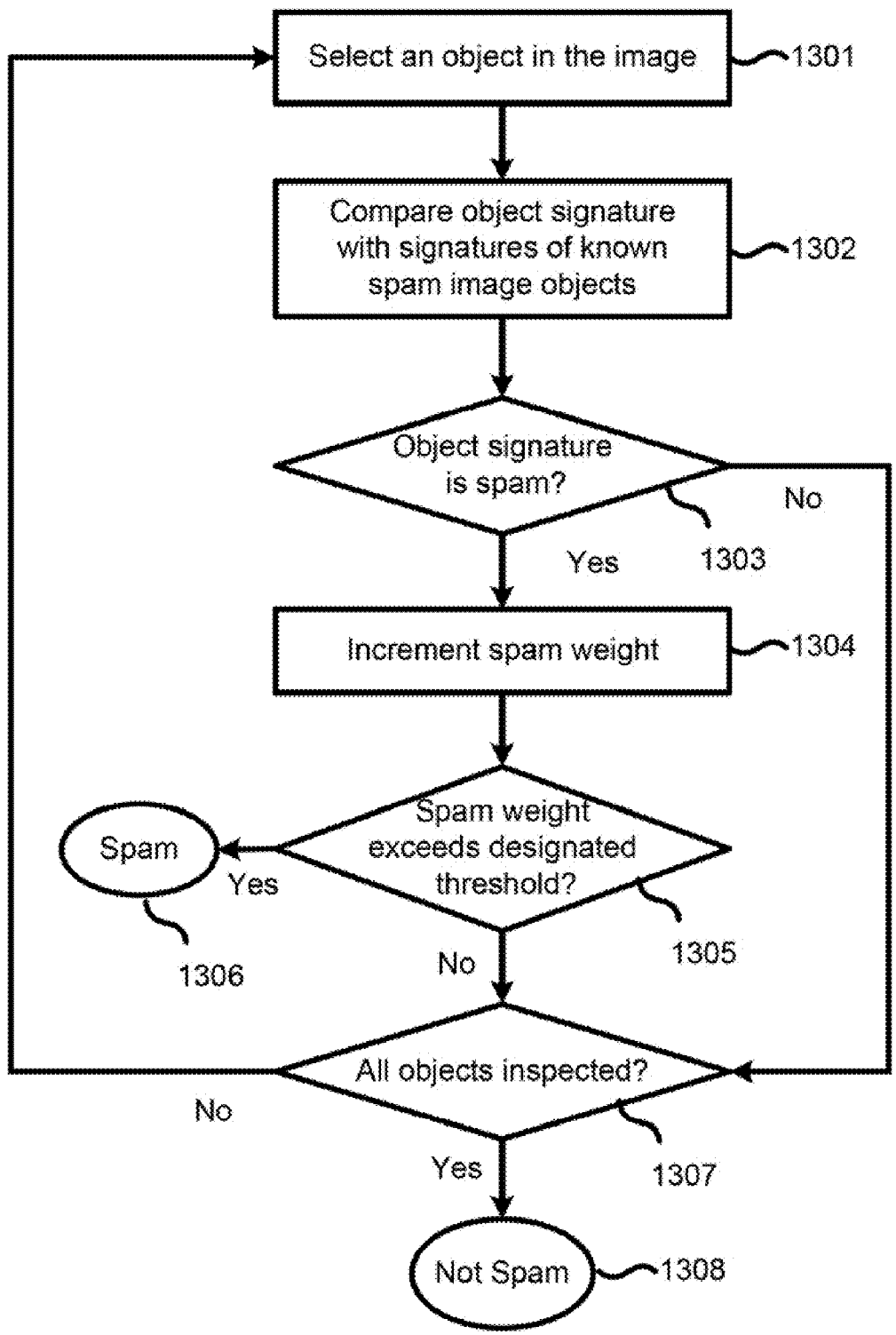
FIG. 13 illustrates a comparison of the resulting image signature with known signatures of spam image objects.

One example embodiment of the process of signature comparison is illustrated in detail in FIG. 13. As shown, an object of the raster image is selected at step 1301. Signature of the selected object is compared with signatures of known spam objects at step 1302. If, based on the results of comparison, the object is identified as spam, at step 1303, a spam weight may be incremented at step 1304. For example, an image containing objects of sexual nature or a blacklisted hyperlink address may be given a spam weight of 100%. Other objects may be given lower spam weight. If the final spam weight exceeds a specified threshold at step 1305, the image is declared to be spam at step 1306. If spam weight for the entire image is below the threshold, signatures of other objects are inspected for spam, at step 1305. If, at step 1307, all objects have been inspected and the spam weight is still below the designated threshold, the raster image may be declared as not spam at step 1308.

Figure 14:
FIG. 14 illustrates an example of a graphic image that contains spam.
Figure 15:
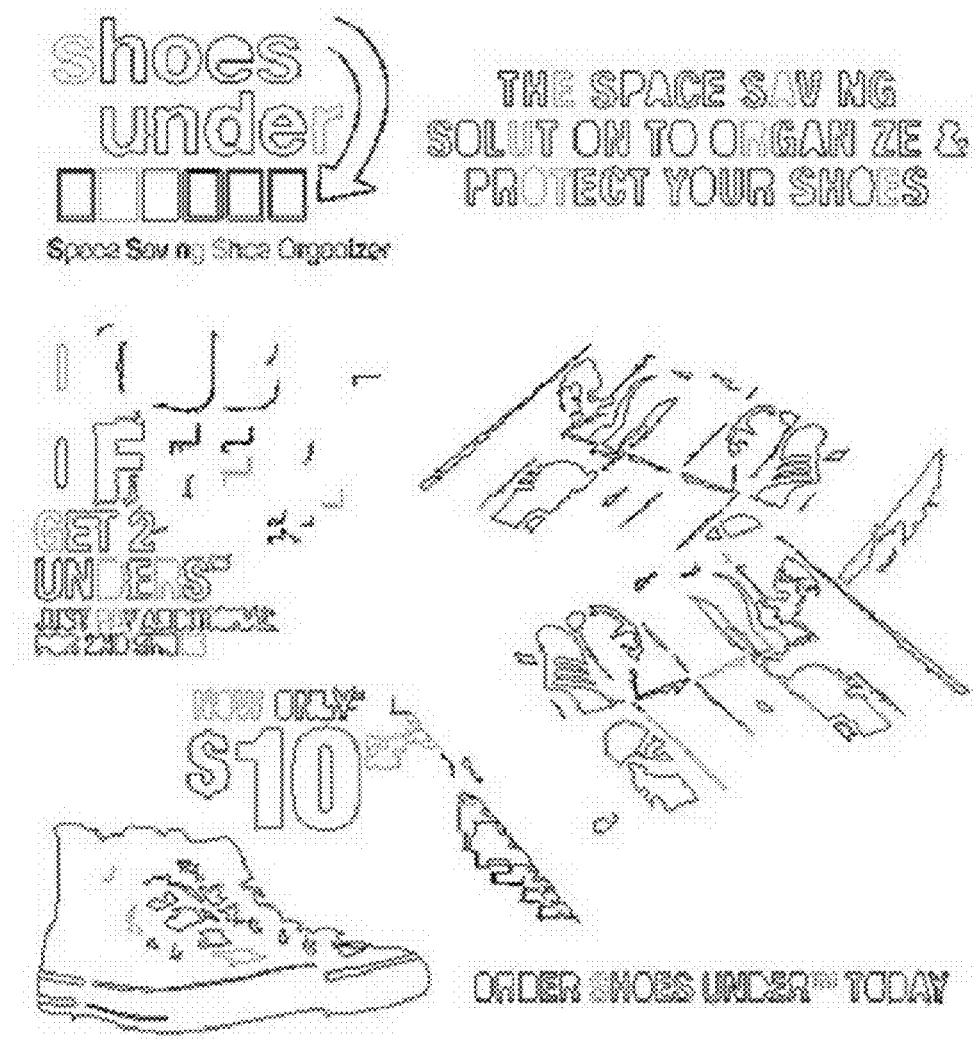
FIG. 15 illustrates the same image in which spam objects are detected using the techniques disclosed herein.

In one example embodiment, object signatures may be compared at step 1302 by comparing the set of elements that form object contour: angles between segments, lengths of straight segments, lengths of arcs and radii of curvature of arcs, etc. Since many similar objects may have unique sets of elements, fuzzy comparison may be used to compare similar sets in accordance with one example embodiment. Fuzzy comparison interprets objects as identical if there is a slight difference between elements (e.g., between lengths of segments and angles between them). FIG. 14 illustrates a graphic image that contains spam. The image contains a small amount of text, although it is written in large letters, and several graphic elements of shoes. Prior art methods for detecting spam that are directed toward detection of spam text may not recognize this image as spam because of the small amount of text in the image. FIG. 15 depicts the same image, analyzed using the contour tracing and object signature comparison techniques disclosed herein in which all objects, both text and image, are correctly identified as spam.

The decision of whether the image is spam or not spam is outputted by the main algorithm at step 209 after which the main algorithm ends. Based on the result of the main algorithm, the computer system 5 may decide whether to delete email messages that contain detected spam images, quarantine suspicious emails, or deliver clean emails to the user.

In various embodiments, the algorithms and methods described herein may be implemented in hardware, software, firmware, or any combination thereof. If implemented in software, the functions may be stored or transmitted as one or more instructions or code on a non-transitory computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-Ray® disc where disks usually reproduce data magnetically, while discs usually reproduce data optically with lasers. Combinations of the above should also be included within the scope of computer-readable media.

In the interest of clarity, not all of the routine features of the implementations described herein are shown and described. It will be appreciated that in the development of any such actual implementation, numerous implementation-specific decisions must be made in order to achieve the developer's specific goals, such as compliance with application-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of limitation, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such. The various embodiments disclosed herein encompass present and future known equivalents to the known components referred to herein by way of illustration. Moreover, while embodiments and applications have been shown and described, it would be apparent to those skilled in the art having the benefit of this disclosure that many more modifications than mentioned above are possible without departing from the inventive concepts disclosed herein.

What is claimed is:

1. A computer implemented method for identifying spam in an image, comprising:
   identifying one or more objects in the image, including text and graphic objects;
   tracing contours of one or more identified objects;
   computing angles of inclination of tangents at plurality of points on an object contour;
   determining, based on the angles of inclination, one or more attributes of the object contour, including lengths of line segments of the contour, angles between line segments the contour, lengths of arcs of the contour and radii of curvature of the arcs of the contour;
   generating object signatures containing one or more attributes of the object contours;
   comparing signatures of one or more objects of the image with known spam signatures;
   determining that the image contains spam if the number of object signatures that are substantially similar to the known spam signatures exceeds a predetermined threshold.

2. The method of claim 1, further comprising converting the image from a vector format into a raster format, prior identifying a plurality of objects in the image.

3. The method of claim 1, further comprising converting the image from a multi-color format into a grayscale format, prior to identifying a plurality of objects in the image.

4. The method of claim 1, wherein identifying one or more objects in the image further comprises rejecting one or more small objects in the image.

5. The method of claim 1, wherein tracing an image contour comprises:
   identifying a background as a plurality of pixels having a first shade of gray;
   identifying one or more pixels that have a second shade of gray;
   defining the contour as the first pixel having the second shade of gray; and
   repeatedly expanding the contour of the object in those directions where pixels adjacent to the background pixels are of the second shade of gray.

6. The method of claim 1, wherein computing angles of inclination of tangents at plurality of points on an object contour comprises:
   selecting a point on the object contour;
   constructing a tangent at the selected point; and
   computing angle of inclination of the tangent with respect to horizontal.

7. The method of claim 1, wherein determining, based on the angles of inclination, one or more attributes of the object contour comprises:
   determining deviation in the values of the angles of inclination of tangents at the two or more adjacent points on the object contour; and
   if the deviation is substantially zero, the two or more adjacent points form a straight line segment, and the length of the line segment is calculated;
   if the deviation is substantially constant, the two or more adjacent points form an arc, and the length and radius of curvature of the arc is calculated.

8. A system for identifying spam in an image, comprising:
   a memory being configured to store an image; and a processor coupled to the memory, the processor being configured to:
identify one or more objects in the image, including text and graphic objects;
trace contours of one or more identified objects;
compute angles of inclination of tangents at plurality of points on an object contour;
determine, based on the angles of inclination, one or more attributes of the object contour, including lengths of line segments of the contour, angles between line segments the contour, lengths of arcs of the contour and radii of curvature of the arcs of the contour;
generate object signatures containing one or more attributes of the object contours;
compare signatures of one or more objects of the image with known spam signatures; and
determine that the image contains spam if the number of object signatures that are substantially similar to the known spam signatures exceeds a predetermined threshold.

9. The system of claim 8, wherein the processor being further configured to convert the image from a vector format into a raster format, prior to identifying a plurality of objects in the image.

10. The system of claim 8, wherein the processor being further configured to convert the image from a multi-color format into a grayscale format, prior to identifying a plurality of objects in the image.

11. The system of claim 8, wherein to identify one or more objects in the image, the processor being further configured to reject one or more small objects in the image.

12. The system of claim 8, wherein to trace an image contour, the processor being further configured to:
identify a background as a plurality of pixels having a first shade of gray;
identify one or more pixels that have a second shade of gray;
define the contour as the first pixel having the second shade of gray; and
repeatedly expand the contour of the object in those directions where pixels adjacent to the background pixels are of the second shade of gray.

13. The system of claim 8, wherein to compute angles of inclination of tangents at plurality of points on an object contour, the processor being further configured to:
select a point on the object contour;
construct a tangent at the selected point; and
compute angle of inclination of the tangent with respect to horizontal.

14. The system of claim 8, wherein to determine, based on the angles of inclination, one or more attributes of the object contour, the processor being further configured to:
determine deviation in the values of the angles of inclination of tangents at the two or more adjacent points on the object contour; and
if the deviation is substantially zero, the two or more adjacent points form a straight line segment, and the length of the line segment is calculated;
if the deviation is substantially constant, the two or more adjacent points form an arc, and the length and radius of curvature of the arc is calculated.

15. A computer program product embedded in a non-transitory computer-readable storage medium, the computer-readable storage medium comprising computer-executable instructions for identifying spam in an image, the medium includes instructions for:
identifying one or more objects in the image, including text and graphic objects;
tracing contours of one or more identified objects;
computing angles of inclination of tangents at plurality of points on an object contour;
determining, based on the angles of inclination, one or more attributes of the object contour, including lengths of line segments of the contour, angles between line segments the contour, lengths of arcs of the contour and radii of curvature of the arcs of the contour;
generating object signatures containing one or more attributes of the object contours;
comparing signatures of one or more objects of the image with known spam signatures;
determining that the image contains spam if the number of object signatures that are substantially similar to the known spam signatures exceeds a predetermined threshold.

16. The medium of claim 15, further comprising instructions for converting the image from a vector format into a raster format, prior to identifying a plurality of objects in the image.

17. The medium of claim 15, further comprising instructions for converting the image from a multi-color format into a grayscale format, prior to identifying a plurality of objects in the image.

18. The medium of claim 15, wherein instructions for tracing an image contour further comprise instructions for:
identifying a background as a plurality of pixels having a first shade of gray;
identifying one or more pixels that have a second shade of gray;
defining the contour as the first pixel having the second shade of gray; and
repeatedly, expanding the contour of the object in those directions where pixels adjacent to the background pixels are of the second shade of gray.

19. The medium of claim 15, wherein instructions for computing angles of inclination of tangents at plurality of points on an object contour further comprise instructions for:
selecting a point on the object contour;
constructing a tangent at the selected point; and
computing angle of inclination of the tangent with respect to horizontal.

20. The medium of claim 15, wherein instructions for determining, based on the angles of inclination, one or more attributes of the object contour further comprise instructions for:
determining deviation in the values of the angles of inclination of tangents at the two or more adjacent points on, the object contour; and
if the deviation is substantially zero, the two or more adjacent points form a straight: line segment, and the length of the line segment is calculated;
if the deviation is substantially constant, the two or more adjacent points form an arc, and the length and radius of curvature of the arc is calculated.

* * * * *